Figure 1:
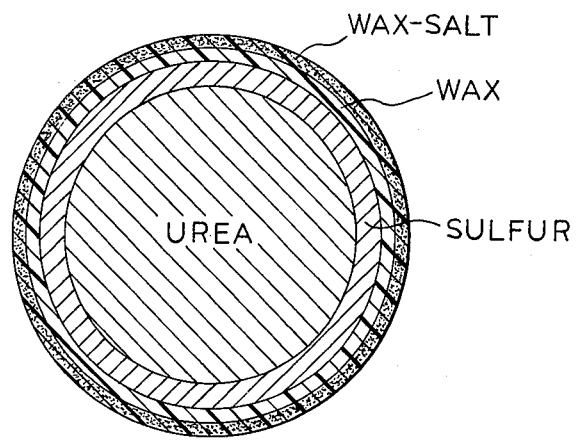

United States Patent

Fersch et al.

[11] 4,042,366
[45] Aug. 16, 1977

[54] CONTROLLED RELEASE FERTILIZER

[75] Inventors: Kenneth Eugene Fersch, Marysville; Wayne Eugene Stearns, West Mansfield, both of Ohio

[73] Assignee: The O.M. Scott & Sons Company, Marysville, Ohio

[21] Appl. No.: 673,791

[22] Filed: Apr. 5, 1976

[51] Int. Cl.² .......... C05B 15/00; C05C 9/00
[52] U.S. Cl. .......... 71/29; 71/64 DB; 71/64 E; 71/64 F; 428/403
[58] Field of Search .......... 71/1, 28, 29, 30, 44, 71/64 F, 64 DB, 64 E; 427/203, 214, 212, 416; 428/403

[56] References Cited

U.S. PATENT DOCUMENTS

| 2,936,226 | 5/1960 | Kaufman | 71/64 F |
|---|---|---|---|
| 3,100,698 | 8/1963 | Horsley | 71/64 DB |
| 3,192,031 | 6/1965 | Zaayenga | 427/212 |
| 3,205,061 | 9/1965 | Mason | 71/64 F |
| 3,242,237 | 3/1966 | Belak | 71/64 F |
| 3,259,482 | 7/1966 | Hansen | 71/64 F |
| 3,276,857 | 10/1966 | Stansbury | 71/64 E |
| 3,295,950 | 1/1967 | Blovin | 71/64 F |
| 3,306,730 | 2/1967 | Malmberg | 71/1 |
| 3,313,615 | 4/1967 | Formaini | 71/64 F |
| 3,331,677 | 7/1967 | Campbell | 71/28 |
| 3,372,019 | 3/1968 | Ioy | 427/212 |
| 3,533,776 | 10/1970 | Coates | 71/64 DB |
| 3,560,192 | 2/1971 | Di Cicco | 71/1 |
| 3,576,613 | 4/1971 | Fleming | 71/28 |
| 3,598,563 | 8/1971 | Burch | 71/64 E |
| 3,666,523 | 5/1972 | Nau | 71/64 DB |
| 3,959,127 | 5/1976 | Bartha | 210/36 |

FOREIGN PATENT DOCUMENTS

| 2,340,638 | 2/1975 | Germany | 671/64 F |

Primary Examiner—Thomas G. Wyse
Assistant Examiner—Ernest G. Therkorn
Attorney, Agent, or Firm—J. B. Raden; H. J. Holt

[57] ABSTRACT

A controlled release particulate fertilizer composition containing nitrogen in a form which is slowly released and a water soluble solid additive, such as a phosphorus or potassium nutrient salt, in a form which is quickly released comprising a core of a water soluble nitrogen nutrient source, a coating of sulfur surrounding the core, and a coating surrounding the sulfur coating of an inert water-insoluble material such as wax. The inert coating comprises an inner portion of the inert coating alone and an outer portion containing the salt or other water soluble additive.

11 Claims, 2 Drawing Figures

CONTROLLED RELEASE FERTILIZER

This invention relates to a controlled release particulate fertilizer composition.

The three elements forming the primary nutrient sources necessary for plant growth — nitrogen, phosphorus and potassium — require different release rates to the soil for optimum utilization. Nitrogen nutrients should be released slowly and steadily to meet the growth needs of the plant. On the other hand, phosphorus and potassium do not move readily in most soils and it is generally desirable that they be released quickly. In the case of phosphorus, it is frequently agronomically undesirable if the nutrient is released slowly.

Many fertilizer products are known in which one or more of the plant nutrients are released in controlled fashion. One such product of considerable promise consists of sulfur coated urea particles. Sulfur is a favorable coating material on the basis of both its effectiveness and its low cost and urea is a desirable nutrient substrate because of its high nitrogen content and ready commercial availability in pellitized form — a form necessary for coating purposes. U.S. Pat. No. 3,295,950 disloses fertilizer compositions made up of sulfur coated urea particles in which the particles may contain either a subcoating or outer coating of a wax or other sealant. The patent also suggests the optional inclusion of other finely divided solids such as insoluble micro-nutrient compounds in the sulfur coating.

A major limitation of the product dislcosed in this patent is that it contains only one of the three essential plant nutrients — nitrogen. Unlike water insoluble micro-nutrients, phosphorus or potassium nutrient sources cannot be included in amounts normally used in a fertilizer in the sulfur coating without adversely affecting the nitrogen release rate. For similar reasons, discussed in more detail below, phosphorus and potassium sources cannot be included in the outer wax coating of a sulfur coated product of the type described in the foregoing patent. Phosphorus and potassium nutrients can be blended in bulk with the sulfur coated urea particles but such a blend lacks the homogeneity desirable for uniform application of the fertilizer.

Virtually all known commerically available coated slow release fertilizers which contain the three primary nutrients include the phosphorus and potassium in the core in some fixed ratio. However, the slow release of phosphorus and potassium is undesirable, for reasons set forth above. Moreover, a product which includes P and K in the core lacks flexibility in that adjustment of the release rate of nitrogen necessarily adjusts the release rate of all nutrients to the same level.

It is accordingly a primary object of this invention to provide a fertilizer product and a process for its production which contains a uniform and homogeneous combination of nitrogen in a form which is slowly released and phosphorus and potassium or other water soluble agronomic additive, in a form which is quickly released.

It is a more specific object of this invention to provide a complete fertilizer product which releases nitrogen, phosphorus and potassium nutrients to the soil an an agronomically desirable rate for each nutrient.

It is a further object of this invention to provide a complete fertilizer product which is free flowing without the need of flow conditioners.

It is still a further object of this invention to provide a complete fertilizer product in which the release rate of nitrogen can be independently adjusted to a predetermined level without affecting the release rate of phosphorus and potassium nutrients.

In has been found that the foregoing and other objects of the invention may be achieved by coating the sulfur coated nitrogen nutrient particles with a dual layer coating of an inert water-insoluble low melting organic material, the inner portion of said inert coating being free of water soluble additives and the outer portion containing at least one water soluble solid additive, such as a phosphorus or potassium salt. The inner portion containing the inert coating alone completely covers the sulfur coating to form a water barrier separating the sulfur from the outer portion containing the water soluble additive. The outer portion of the coating contains embedded therein particles of the water soluble solid within a critical size range, namely from 325 to 30 mesh size. The ratio of the weight of the nutrient salt or other water soluble additive to the total weight of inert coating is also critical and should be less than 8, preferably from 2 to 8.

The process of making the invention comprises heating to a temperature of from 40° to 100° C particles containing a core of a water-soluble nitrogen nutrient source coated with a layer of sulfur, coating the heated sulfur-coated particles with a molten low melting, inert water-insoluble organic coating material to completely cover the sulfur coating, coating the organic coated particles with at least one inorganic water soluble additive in particulate form of from 325 to 30 mesh size and coating the thus coated particle with an additional coating of a molten low melting inert water-soluble organic coating material, the ratio by weight of the water soluble additive to the total weight of the organic coatings being less than 8.

Figure 2:
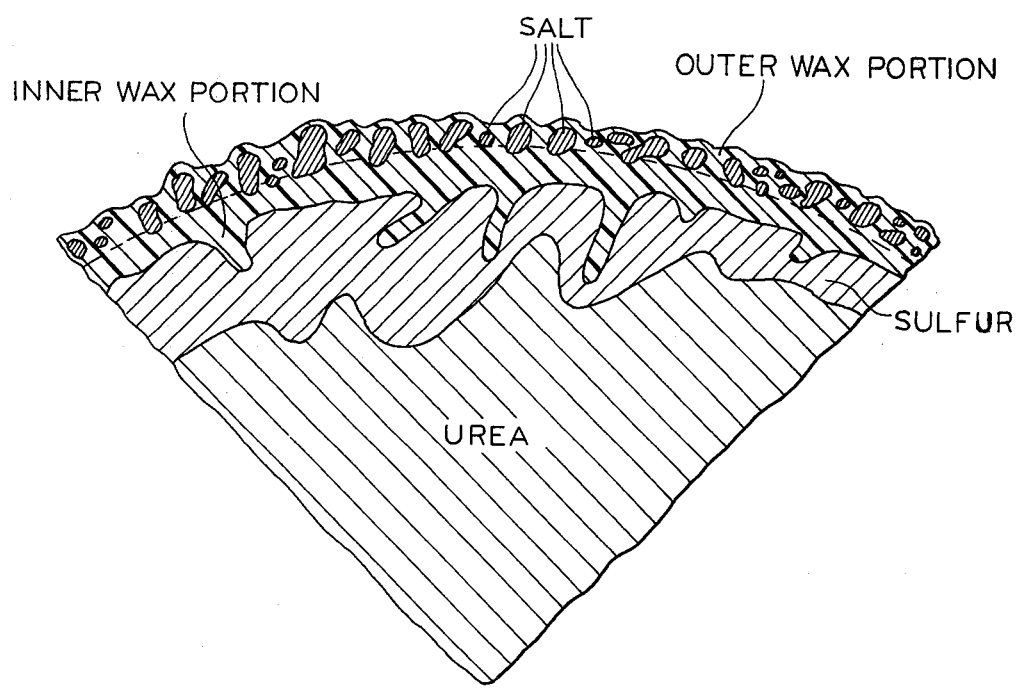

The invention will be better understood in connection with the attached drawing in which FIG. 1 is an enlarged cross-sectional view of a fertilizer particle in accordance with the invention and FIG. 2 is a still further enlarged cross-sectional view of a segment of the particle shown in FIG. 1.

As shown in the drawing, a sulfur coated urea prill usbstrate is covered by a dual-layer wax coating. As the two separately applied coatings actually fuse in the final product, the drawing illustrates the salt-free inner portion and the salt-containing outer portion. It is not intended to illustrate the actual boundaries of the separately applied coatings. The inner wax portion serves several functions. It completely covers the sulfur coating and fills any voids or imperfections that occur in the sulfur coating, which in turn result from surface irregularities and imperfections which normally occur in the urea prill. These imperfections can be seen in FIG. 2 of the drawing. The inner wax portion also acts as a buffer of watter barrier between the sulfur coating and the salt particles embedded in the outer wax portion. In the absence of such a water barrier, the water soluble salt particles would form a water path to the sulfur and greatly increase the nitrogen release rate. The inner wax portion also acts as a sticking agent for the salt particles; the salt particles will not adhere directly to the sulfur coating.

As has previously been noted, an acceptable controlled release product cannot be prepared by mixing the phosphorus and potassium salts with either the sulfur coating or with a wax coating applied directly to the sulfur. The water soluble salt particles would form a water path to the urea core in the one case, or the sulfur coating in the other case. In both cases, the slow release characteristics of the product would be seriously impaired. Moreover, the sulfur coating is most efficiently applied to the urea as a molten spray and it would be difficult to spray a sulfur-salt mixture or slurry. In the case of a salt-wax mixture, a similar coating difficulty would be encountered. For reasons set forth below, it is necessary to use up to 8 times as much salt as wax in the coating and it would be virtually impossible to prepare a coatable slurry from a mixture containing such a high proportion of salt.

The ratio by weight of the water soluble additive to wax, or other inert organic coating, should be less than about 8 to provide proper flow of the final product, to provide the necessary rate of nitrogen release and to insure adherence of the inorganic additive to the inner wax coating. For example, a pure wax outer coating would have totally inadequate flow properties. As the ratio of salt to wax is increased, the flow properties of the final product are improved and the nitrogen release rate is faster but the adherence of the salt to the wax is reduced. All other factors being equal, higher ratios are preferred because the nutrient content is higher relative to the inert content. However, lower ratios within this range may be used where longer nitrogen release rates are desired. Ratios of less than about 2 may be used but the quantity of inert material in such ratios with quantities of P & K normally used in fertilizers is so great that the economics of the product are seriously impaired.

The particle size of the inorganic water soluble additive should be between 30 and 325 mesh U.S. sieve and preferably in the range of 60 and 200. In general, as the size of the additive particle increases over this range, the slower the nitrogen release rate and the better the flowability of the final product, but the more difficult the attachement of the P and K on the wax inner coating. At sizes smaller than 325 mesh, the uniformity of distribution of the P and K is too low, while at sizes larger than 30, it is difficult to adhere the particles to the wax or other inert coating.

The ratio by weight of the inner applied wax coating to the outer applied wax coating may vary from about 0.2 to 4, but preferably is about 1. The relative amount of undercoat affects the nitrogen release rate — higher ratios producing a lower release rate. The amount of total wax should of course be as low as possible for both reasons of cost and product nutrient analysis.

Overall, a wide range of nutrient proportions may be used in the invention having nitrogen-phosphorus ($P_2O_5$)-potassium ($K_2O$) analytical ratios (by weight) such as 35-1-1, 28-4-4, 14-14-14 or 28-8-0. As the amount of P and K in the product increases from weight ratios of X-1-1 to X-14-14, the salt particle size and salt/wax ratio should normally be increased to maintain a proper balance of product flowability and salt adherence.

The process of making the invention may be carried out with any one of a number of well known water soluble nitrogen nutrient sources and inert coating materials. For purposes of illustration, the following description of the process will be in connection with the coating of a particle containing a urea core and an outer dual layer of wax.

The sulfur coated urea particles may be prepared by known techniques. Normally, such techniques involve the spraying of molten sulfur onto the urea pellets as the pellets are tumbled or otherwise moved. Sulfur has a melting point of about 115° C and should be heated above this temperature prior to spraying. The sulfur coated urea particles should have about 5 to 40 weight percent of sulfur coating based on the total weight of the particles. Molten wax is distributed over the sulfur coated urea particles in, for example, a rotary drum until the sulfur is completely covered. A retention time in the drum is needed after the initial wax addition to fully coat the sulfur. This time is a function of temperature and type of wax but is normally from 1 to 5 minutes. The P and K salts are dispersed over the wax coating and then the second layer of molten wax is applied in the same drum. The temperature during the wax-salt-wax coating process is maintained at from 40° to 100° C. At temperatures over 100° C, a phase change occurs in the sulfur which is detrimental. The tacky product is then cooled to below the softening or congealing temperature of the wax. The resulting product is a dust free, free-flowing, homogeneous product that can be applied to vegetation by any conventional particulate spreading means. Only the urea release is controlled -- the water soluble P and K sources or other water soluble additive are released essentially immediatelly when they come into contact with water.

For convenience, the foregoing discussion has referred to the use of phosphorus and potassium nutrient salts as the immediately available water soluble additive in the outer coating. The invention is particularly adapted to the inclusion of P and K nutrient salts and this represents the preferred product of the invention. However, the invention is also useful for the inclusion of inorganic particulate additives intended for immediate availability, other than P and K, including other water soluble nutrients, micronutrients, and pesticides and the foregoing description is applicable to such other additives.

The following examples illustrate the practice of the invention. All parts and percentages are by weight unless otherwise indicated.

EXAMPLE 1

The following is an example of a typical coating operation in accordance with the invention. 200 g of sulfur coated urea typically having a mesh size (U.S. sieve) between 6 and 12, is placed in a 10 inches × 11 inches deep stainless steel drum mounted at 10°–30° from the horizontal and rotating at 30–55 rpm. The drum is equipped with flights located at right angles to the drum wall. The sulfur coated urea particles are warmed to between 40° and 100° C with hot air directed towards the outer portion of the drum. The particles can be added directly from the sulfur coating operation with only nominal heat to maintain temperature. Molten wax, 2½ to 10 g. preferably a microcrystalline wax with an oil content ranging from 0 to 10% is dripped onto the moving bed of sulfur coated urea particles. When the wax addition is completed, the bed is allowed to roll 1 to 5 minutes to obtain an even coating of wax over all particles. While still heated in the drum, a blend of monammonium phosphate, 20 g, and potassium sulfate, 20 g, (for an X-4-4, N-P-K, product) both ground to a mesh size of 30 to 325, or some part therof, is dusted over the wax coated particles to give a relatively free-flowing bed. While the temperature is maintained in the drum, another layer of molten, microcrystalline wax, 2½ to 10 g, is dripped over the mixture to provide the final coating which prevents the particles of monammonium phosphate and potassium sulfate from flaking off the product. The tacky product is cooled to below the congealing point of the wax, 40°–95° C, by removing the hot air and blowing ambient temperature air over or thru the particles. On a continuous scale, the same general steps set forth in Example 1 are followed using directly scaled-up flow rates from the batch process and equipment of appropriate size and retention times. Sulfur coated urea particles, already hot (40° to 100° C), directly from the sulfur coating process or reheated if initially cold is metered continuously into a rotating drum. The undercoat wax (first wax addition) is dripped onto the flowing bed or can be sprayed if desired which reduces required retention time for an even coating. P and K salts are metered out of separate feeders into a screw conveyor (which provides sufficient blending) and discharged into the same coating drum as the undercoat wax addition down stream from that wax addition. Although the conveyor may discharge the salt directly in one stream on the rotating bed, it is preferred to provide a distributor for the salt to the bed of about 4 to 24 inches for a product flow of 250 lb/hr. This enables a more homogeneous appearing product. The overcoat wax (second wax addition) is then dripped or sprayed down stream of the salt addition also in the same coating drum. The product is then discharged to a suitable cooling apparatus such as a fluid bed cooler, rotating drum with air blowing on the bed, or a screen rotating drum with air blowing through the screen. The product is then scalp screened as desired.

EXAMPLE 2

Using the batch process of Example 1, a series of sample products were prepared. The microcrystalline wax used was that sold under the trademark Shellmax 500. Shellmax 500 has a melting point of 61° C, an oil content of 0.9%, a needle penetration at 25° C of 21 and at 43° C of 125 (per ASTM D-1321) and a viscosity at 99° C of 79 SUS (ASTM D-88). The salts were monoammonium phosphate and potassium sulfate. A salt/wax ratio of 5 was used in each case. The operating temperature was about 67° C and the drum speed was 39 rpm. The salt particle size was varied with the following results.

| Salt Size | −200 | −150 + 200 | −100 + 150 | −65 + 100 |
|---|---|---|---|---|
| Oversize (%) | 3.6 | 1.2 | 0.65 | 0 |
| Fines (%) | 0 | 0.25 | 0.45 | 1.20 |

The above shows that as the salt size decreases (increasing mesh number), the amount of oversize in the cooled product increases at an exponential rate. Also as salt size increases, the amount of fines, or unattached P and K salts also increases in an exponential manner. As can be seen, outside this salt size range both oversize and/or fines will begin to become significant losses to the final product. Thus, the range illustrated, from 65 to 200 mesh size, is the preferred range.

EXAMPLE 3

A series of samples were prepared as in Example 2, but with a drum speed of 35 rpm and an operating temperature of 70° to 75° C. 20 g of each salt was used throughout except for samples 1 and 2 which did not include either P or K. The first sample was the sulfur coated urea substrate alone while the second was the sulfur coated urea substrate coated only with wax. Two weight % Pikes Peak clay was required as a flow conditioner in the wax only run, Sample 2. The nitrogen release rate as measured by the amount of N dissolved in water after one week at ambient temperature is given below as a function of salt size and salt/wax ratio.

| Sulfur Coated Urea Sample | Salt/Wax Ratio | Mesh Size of Salt | Amount N Released (%) |
|---|---|---|---|
| 1. (No other coating) | — | — | 61 |
| 2. (2% wax coating) | — | — | 17 |
| 3. | 4 | −65 + 100 | 27 |
| 4. | 4 | −100 + 150 | 30 |
| 5. | 4 | −150 + 200 | 35 |
| 6. | 5.6 | −150 + 200 | 47 |

The above demonstrates the affect of salt size and salt/wax ratio on the release rate of nitrogen. The affect of 2% wax alone on the sulfur coated urea only (Sample 2) is seen by comparison of the release rate with that of Sample 1. This may be considered as the optimum sealing of sulfur coating surface deficiencies. The increase in the nitrogen release with decrease in salt size can also be readily seen in Samples 3 - 5 with all other conditions constant. The last two samples show that as the salt/wax ratio is increased so is the release of nitrogen. In this case the lower amount of wax provides less of a water barrier relative to the given amount of salt. The above results show that the nitrogen release rate may be varied within the limits of the invention to provide a given nitrogen release rate favorable to a specific agronomic species.

EXAMPLE 4

To demonstrate the affect of the amount of P and K put on the sulfur coated urea and the distribution of the P and K on the sulfur coated urea, a series of samples are shown below which were again prepared by the process of Example 2.

| N-P-K | 25-4-4 | 29-4-4 | 29-4-4 | 21-3-3 | 20-9-9 |
|---|---|---|---|---|---|
| Salt/Wax | 4.0 | 4.9 | 4.9 | 4.9 | 4.7 |
| Fines (Wt.%) | 0.30 | 0.65 | 1.2 | 0.04 | 0.06 |
| Oversize (Wt.%) | 0.30 | 0.45 | 0 | 2.9 | 1.6 |
| Distribution* | 5 | 4 | 5 | 2 | 4 |
| Salt Size (mesh) | −60+150 | −100+150 | −60+100 | −200 | −60+150 |

*Rating of evenness of P & K on the sulfur coated urea were 5 = excellent and 1 = some prills without P & K on them.

On the three X-4-4 and the 21-3-3 products, the relationship between salt/wax ratio and salt size on the amount of fines, oversize, and distribution is again seen. When the total amount of P and K increases as in the 20-9-9 above, the salt size and salt/wax ratio must be increased to maintain distribution and reduce oversize. The 20-9-9 and 21-3-3 are very similar products (salt/wax, fines and oversize) for greatly different salt sizes except that distribution is improved with the 20-9-9. For the same salt/wax ratio and roughly the same salt size, the 20-9-9 has lower fines than the 29-4-4, greater oversize, and about the same distribution characteristics.

EXAMPLE 5

Using the process of Example 2, salt was added to sulfur coated urea and then the wax applied. Theoretical analysis based on inputs to the batch and actual product analysis are shown below:

|  | Theoretical | Actual |
|---|---|---|
| N-P-K | 29.6 -2.2 -2.1 | 31.2 -1.3 -1.2 |
| Salt/Wax | 1.46 | |

The surface of the final product was smooth but, as can be seen above, a very significant P and K loss resulted in the screened product. The fines consisted of wax coated, agglomerated salt particles. Distribution of the P and K on the sulfur coated urea was poor.

EXAMPLE 6

Using the process of Example 2, wax was added to sulfur coated urea followed by salt addition. Theoretical analysis based on inputs to the batch and actual product analysis are shown below:

|  | Theoretical | Actual |
|---|---|---|
| N-P-K | 29.6 -2.2 -2.1 | 30.8 -1.3 -0.9 |
| Salt/Wax | 1.65 | |

The resulting product had very uniform P and K distribution but was "sandy" to the touch. Again, however, the P and K attachment was poor in spite of a low salt/wax ratio.

From Examples 5 and 6 it is seen that although salt can be put on sulfur coated urea with only one wax addition, the efficiency is very poor.

EXAMPLE 7

Two products, submitted for a $P_2O_5$ and $K_2O$ dissolution rate analysis and prepared per example 1, are shown below with the percent of $P_2O_5$ and $K_2O$ leached after one week in a beaker of water.

| N-P-K | $P_2O_5$ | $K_2O$ |
|---|---|---|
| 29-3-3 | 86 | 98 |
| 14-14-14 | 72 | 100 |

The results show that the P and K salts are essentially immediately available. The lower leach rates for $P_2O_5$ are attributed to the less than 100% cold water solubility of monammonium phosphate.

EXAMPLE 8

This example illustrates the use of ferrous ammonium sulfate (FAS) as the particulate water soluble nutrient salt in place of the P and K salts of the previous examples. A product was prepared as in Example 2, except that −100 mesh FAS was used in place of the P and K salts. The salt/wax ratio was 4.0 and the total quantity of FAS used was equivalent to an X-4-4 product, if P and K had been used instead of FAS. The resulting product was a 28-0-0-2Fe fertilizer with no fines, 0.4% oversize and a good salt distribution. The nitrogen release rate was typical of the foregoing examples 1 – 4 and 7 containing P and K. The iron salts may also be blended with, rather than substituted for, the P and K salts.

The nitrogen source useful in the invention is preferably urea but may be any conventional water soluble nitrogen nutrient source in solid particulate form including, for example, ammonium nitrate or ammonium sulfate. The phosphorus and potassium nutrient source may be any solid, commercially available P and K fertilizer that contains either or both of the two nutrients such as triple super phosphate, monoammonium or diammonium phosphate, potassium sulfate or potassium chloride. Other dry, particulate water soluble solids of the appropriate mesh size and in the appropriate proportion to inert organic coating, may also be used including other water soluble iron nutrient salts, water soluble micronutrients such as boric acid, molybdic acid, copper sulfate, manganese sulfate and zinc sulfate and water soluble pesticides.

The inert, water-insoluble organic coating should have a melting point below the melting point of sulfur (115° C) and preferably below 100° C, but above 30° C, that is above ambient temperature and preferably well above. It should also preferably have a wide congealing range and a degree of tack when heated. Preferred properties of the coating material are a melting point of 55° – 85° C, a needle penetration at 25° C of 10 – 30 and at 43° C of 75 – 150 (per ASTM D-1321) and a viscosity (per ASTM D-88) at 99° C of 50 – 125 SUS (Saybolt Universal Seconds). The waxes should also preferably have an oil content of from 0 to 10%, even more preferably from 0.5 – 5% by weight. A preferred class of materials possessing the foregoing properties are the microcrystalline waxes, particularly those sold under the trademarks Shellmax 500 and 905, Indramic 5055-AH and Bowax 85. Shellmax 905 has a melting point of 79° C, a viscosity at 99° C of 120 SUS, a needle penetration at 25° C of 30 and an oil content of 3½%. Indramic 5055-AH has a melting point of 66° – 68° C, a congealing point of 63° C, an oil content of 0.8% and a needle penetration at 25° C of 25. Bowax 845 has a melting point of 63° – 68° C, a needle penetration at 25° C of 23 – 28 and a viscosity at 99° C of 85 SUS. An additional example of a useful microcrystalline wax is that sold under the trademark Concord Wax 112. It has a needle penetration at 25° C of 10 – 15, a melting point of 77° – 82° C, a viscosity at 99° C of 75 – 100 and an oil content of 1.0 maximum.

Other suitable organic coating materials are paraffin waxes, low molecular weight hydrocarbon polymers, petrolatums and wood rosins, either alone or in admixture with each other or with petroleum oils. Examples are polyethylene greases such as that sold under the trademark Epolene C-305G, a fully refined paraffin such as that sold under the trademark Bowax 1435 (melting point 67° – 70° C, oil content 0.1%, penetration at 25° C of 12, viscosity at 99° C of 49), or a blend of 30% of a low molecular weight polyethylene and 70% of brightstock process oil. Other suitable examples of inert organic coatings having the properties set forth above will occur to those skilled in the art.

What is claimed is:

1. A controlled release fertilizer composition in particulate form, each of said particles comprising nitrogen in a form which is slowly released and an inorganic water soluble additive in a form which is quickly released, each of said particles comprising
   a core of water soluble nitrogen nutrient source,
   a coating of sulfur surrounding said core, and
   a coating surrounding said sulfur coating of wax, said coating comprising an inner portion free of water soluble additives and an outer water soluble additive-containing portion, the inner portion completely covering said sulfur coating and forming a water barrier separating said outer portion from said sulfur coating, the outer portion containing embedded therein particles of at least one inorganic water soluble solid additive of from 325 to 30 mesh size, the ratio by weight of the solid additive to the total weight of said wax being less than 8.

2. The controlled release fertilizer composition of claim 1 in which the outer portion of the wax coating contains a salt selected from the group consisting of phosphorus and potassium nutrient salts.

3. The controlled release fertilizer composition of claim 1 in which the wax has a melting point between 30° and 100° C.

4. The controlled release fertilizer composition of claim 1 in which the wax has a melting point between 55° and 85° C, a needle penetration at 25° C of 10 – 30 and a viscosity at 99° C of 50 – 125 SUS.

5. The controlled release fertilizer of claim 1 in which the wax is microcrystalline wax.

6. The controlled release fertilizer composition of claim 1 in which the nitrogen nutrient is urea.

7. The controlled release fertilizer of claim 1 in which the ratio by weight of the solid additive to the total weight of the wax coating is between 2 and 8.

8. The controlled release fertilizer of claim 1 in which the ratio by weight of the inner portion of said wax coating to the outer portion of said organic coating is between 0.2 and 4.

9. The controlled release fertilizer of claim 1 in which the sulfur is from 5 to 40 percent by weight of the total weight of the particle.

10. A controlled release complete fertilizer composition in particulate form, each of said particles comprising nitrogen in a form which is slowly released and phosphorus and potassium in a form which is quickly released, each of said particles comprising
a core of water soluble nitrogen nutrient source,
a coating of sulfur surrounding said core, and
a coating surrounding said sulfur coating of microcrystalline wax, said coating comprising an inner salt-free portion and an outer nutrient salt-containing portion, the inner portion completely covering said sulfur coating and forming a water barrier separating said outer salt-containing portion from said sulfur-coating, the outer portion containing embedded therein particles of a phosphorus and potassium nutrient salt of from 325 to 30 mesh size, the ratio by weight of the nutrient salt to the total weight of said wax coating being less than 8.

11. The controlled release fertilizer of claim 10, in which the particles of the nutrient salt are from 200 to 65 mesh size.

* * * * *